United States Patent [19]
Kirkwood

[11] Patent Number: 5,337,867
[45] Date of Patent: Aug. 16, 1994

[54] TORQUE CONVERTER HAVING A CONTINUOUS SLIP BYPASS CLUTCH WITH MULTIPLE FRICTION PLATES

[75] Inventor: Malcolm E. Kirkwood, Pollyanna, Mich.

[73] Assignee: Borg-Warner Automotive, Inc., Sterling Heights, Mich.

[21] Appl. No.: 3,891

[22] Filed: Jan. 13, 1993

[51] Int. Cl.$^5$ .............................................. F16D 33/00
[52] U.S. Cl. .................. 192/3.29; 192/106.1; 192/106.2
[58] Field of Search ............... 192/3.29, 3.28, 106.1, 192/106.2

[56] References Cited

U.S. PATENT DOCUMENTS

| | | | |
|---|---|---|---|
| 3,497,043 | 2/1970 | Leonard | 192/0.052 |
| 4,088,212 | 5/1978 | Brown | 192/106.2 |
| 4,269,296 | 5/1981 | Flotow et al. | 192/106.2 |
| 4,305,487 | 12/1981 | Sunohara | 192/3.28 |
| 4,785,924 | 11/1988 | Jäckel | 192/3.29 |
| 4,821,855 | 4/1989 | Jäckel | 192/3.29 |
| 4,867,290 | 9/1989 | MacDonald et al. | 192/3.28 |
| 4,951,788 | 8/1990 | Martin | 192/3.29 X |
| 5,054,590 | 10/1991 | Paulsen | 192/3.29 X |
| 5,129,493 | 7/1992 | Edmunds | 192/3.29 |
| 5,172,796 | 12/1992 | Campbell et al. | 192/3.29 |
| 5,186,292 | 2/1993 | Hageman et al. | 192/3.29 X |
| 5,211,270 | 5/1993 | Tamura et al. | 192/3.29 |

FOREIGN PATENT DOCUMENTS

| | | | |
|---|---|---|---|
| 57-94164 | 6/1982 | Japan | 192/3.28 |
| 63-259269 | 10/1988 | Japan | 192/3.28 |
| 3-144153 | 6/1991 | Japan | 192/3.29 |
| 511798 | 8/1939 | United Kingdom . | |

Primary Examiner—Rodney H. Bonck
Assistant Examiner—Andrea Pitts
Attorney, Agent, or Firm—Reising, Ethington

[57] ABSTRACT

A torque converter has a continuous slip bypass clutch with multiple friction plates one of which is directly coupled to the inside diameter of the front cover of the torque converter and another of which is directly coupled to a hub connected to the output shaft of the converter and wherein the bypass clutch is activated when there is excessive torque converter slip so as to engage plural friction surfaces on the multiple friction plates for providing a heat resistant slip connection between the front cover and the output shaft.

1 Claim, 4 Drawing Sheets

TORQUE CONVERTER HAVING A CONTINUOUS SLIP BYPASS CLUTCH WITH MULTIPLE FRICTION PLATES

BACKGROUND OF THE INVENTION

1. Field of the Invention

This invention relates to torque converters and more particularly to torque converters with an associated clutch to control slip between the input and output components of a torque converter.

2. Description of the Related Art

Torque converters used in association with automatic transmissions for vehicles, under certain operating conditions, are subject to a substantial degree of slip resulting in reduced powertrain fuel efficiency.

One approach to the problem is to provide a lock-up clutch in association with the torque converter. Such lock-up clutches are shown in U.S. Pat. Nos. 3,497,043 and 4,305,487. While lock-up clutches solve the problem of excessive slip between the inlet and outlet components of a torque converter, they are subject to input distortions that require the addition of a spring damper assembly to attenuate torsional disturbances generated by an internal combustion engine connected to the input of the torque converter.

In the arrangement shown in the '043 patent, the damper assembly requires a spline ring connection to the turbine runner. Such arrangements are difficult to assemble and in the case of the '043 patent have only one friction surface in the clutch that in some cases may not provide enough friction surface area to lock-up torque converters having a high torque capacity.

In the arrangement shown in the '487 patent, the damper assembly includes a plate that is connected by weldments to the outer shell of the turbine runner. This connection is difficult to assemble. Furthermore, the '487 patent only shows a lock-up clutch that has one friction surface that in some cases may not provide enough friction surface to lock-up torque converters having a high torque capacity.

In still other prior art torque converter lock-up clutch designs, more than one friction surface is provided to increase the surface area of the friction surface in accordance with the torque capacity of the torque converter to assure lock-up.

In each of the aforedescribed arrangements, a spring damper assembly is provided to attenuate engine disturbances inputed to the torque converter.

An additional problem that occurs in the aforesaid clutch mechanisms is that, when subjected to alternate functional calibration scenarios, the operation of the clutch can cause increases in the local friction surface interface temperature elevating the automatic transmission fluid (ATF) operating temperature. Friction modifiers in such ATF degrade when temperatures increase so as to adversely affect the lock-up performance of the clutch.

SUMMARY OF THE PRESENT INVENTION

According to the present invention a continuously operative slip clutch is provided that will selectively couple the input of a torque converter to the output thereof so as to reduce the slip between the input and output without directly coupling the components together. The slip clutch assembly is arranged to connect between the front cover of a torque converter and a hub connected to the output shaft so as to avoid the need to connect a spring damper assembly directly to the shell of a turbine runner of the torque converter. The slip clutch assembly is also configured to provide more than one friction surface to prevent excessive build-up of heat during periods in which the slip clutch assembly is actively engaged thereby providing a heat resistance slip connection directly between the front cover and the output shaft of the torque converter.

An object of this invention is to provide an improved clutch assembly for a torque converter that eliminates the need for a separate spring damper assembly.

A further object of this invention is to provide an improved clutch assembly for increasing the efficiency of a torque converter wherein the clutch assembly provides a heat resistant slip connection directly connected between the front cover and the output shaft of the torque converter.

It is a still further object of this invention to provide an improved clutch assembly for a torque converter wherein the torque load from the front cover is split in part through the piston for actuating the clutch and in part through a friction plate of the clutch assembly and wherein both the friction plate and piston are joined to an inner plate directly connected to the output shaft.

DESCRIPTION OF THE PREFERRED EMBODIMENT

Figure 1:
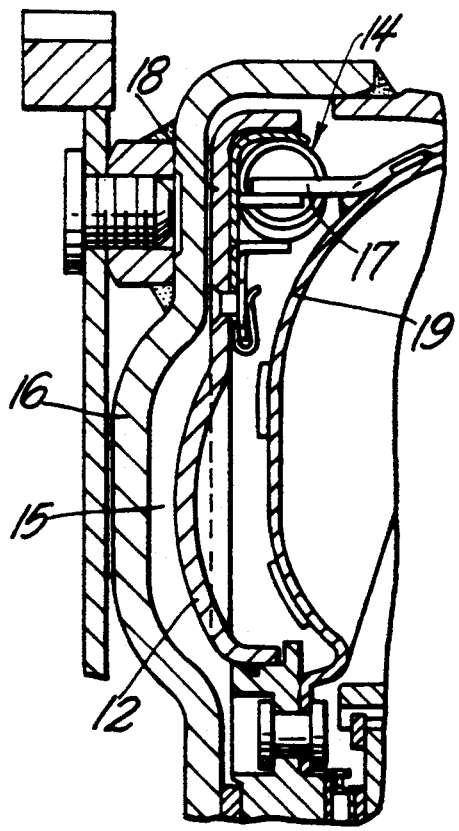
FIG. 1 is a partial sectional view of a prior art torque converter with a lock-up clutch.
Figure 2:
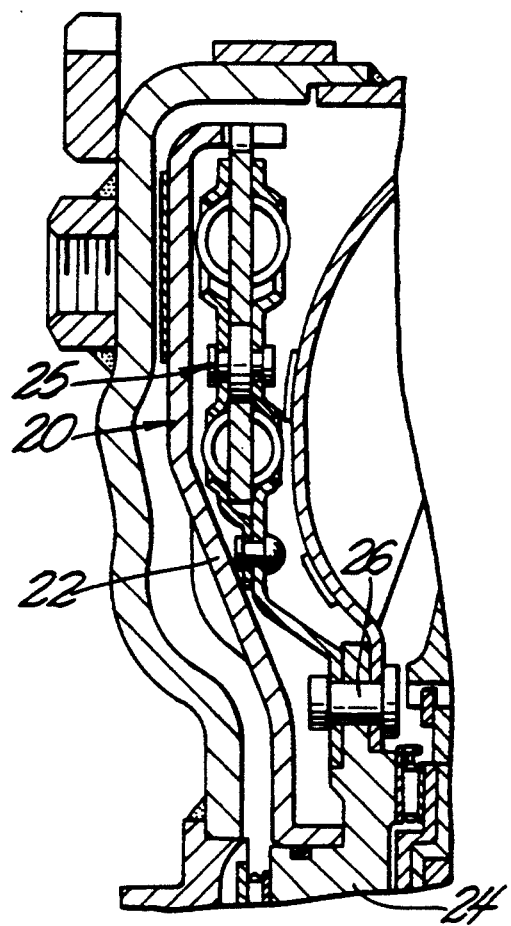
FIG. 2 is a partial sectional view of a another prior art torque converter with a lock-up clutch.
Figure 3:
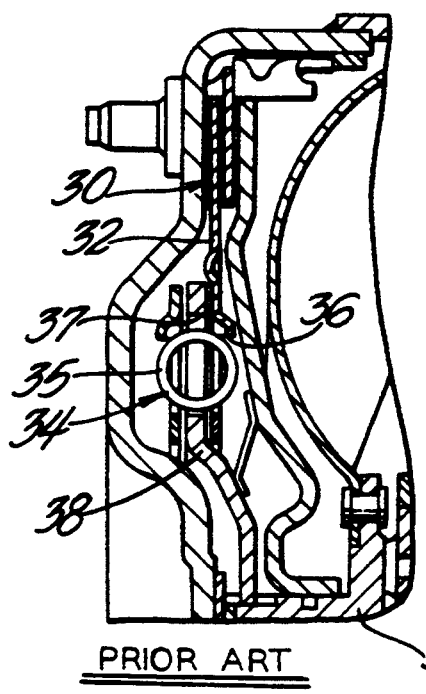
FIG. 3 is a partial sectional view of still another prior art torque converter with a lock-up clutch.
Figure 4:
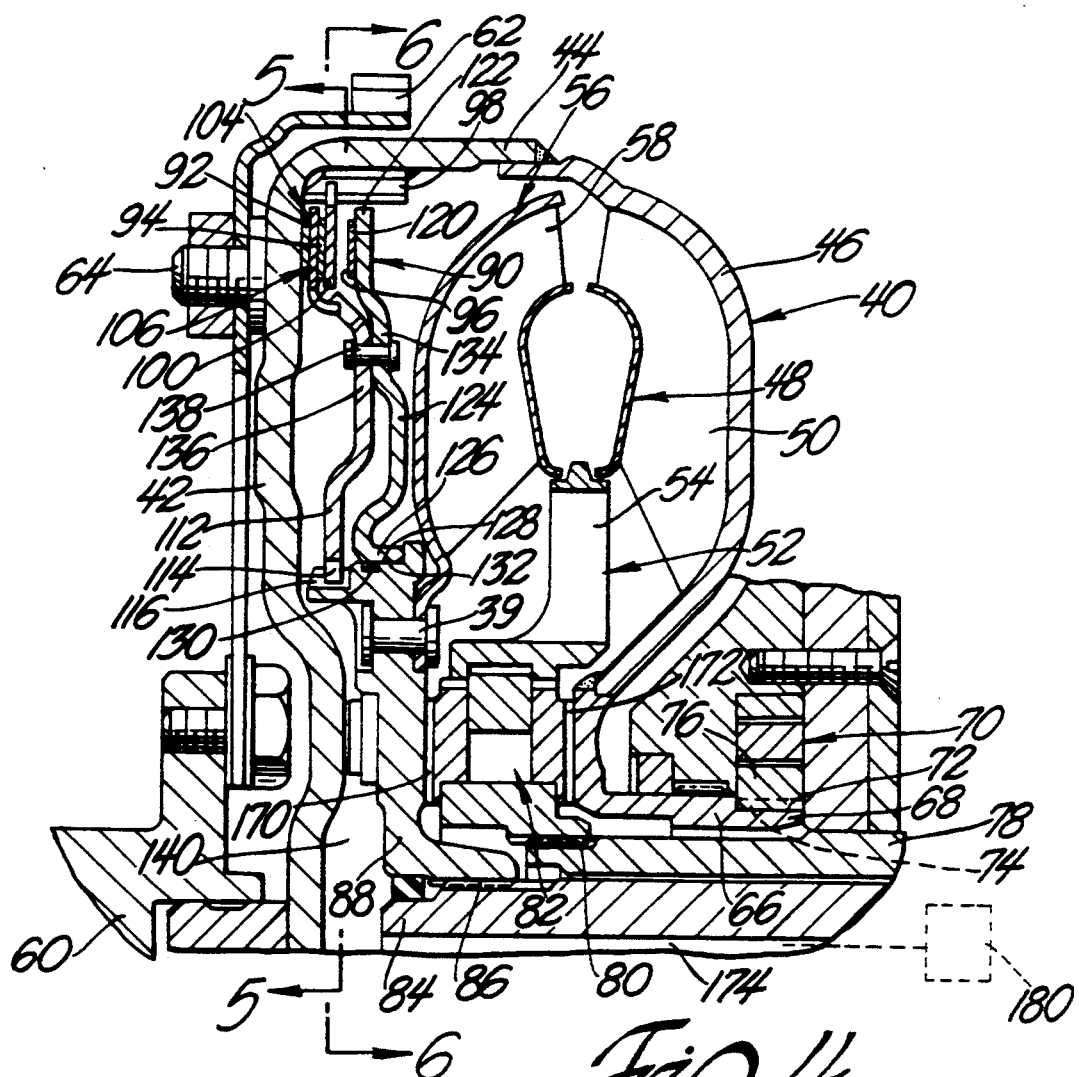
FIG. 4 is a sectional view of a torque converter with a slip clutch of the present invention.
Figure 7:
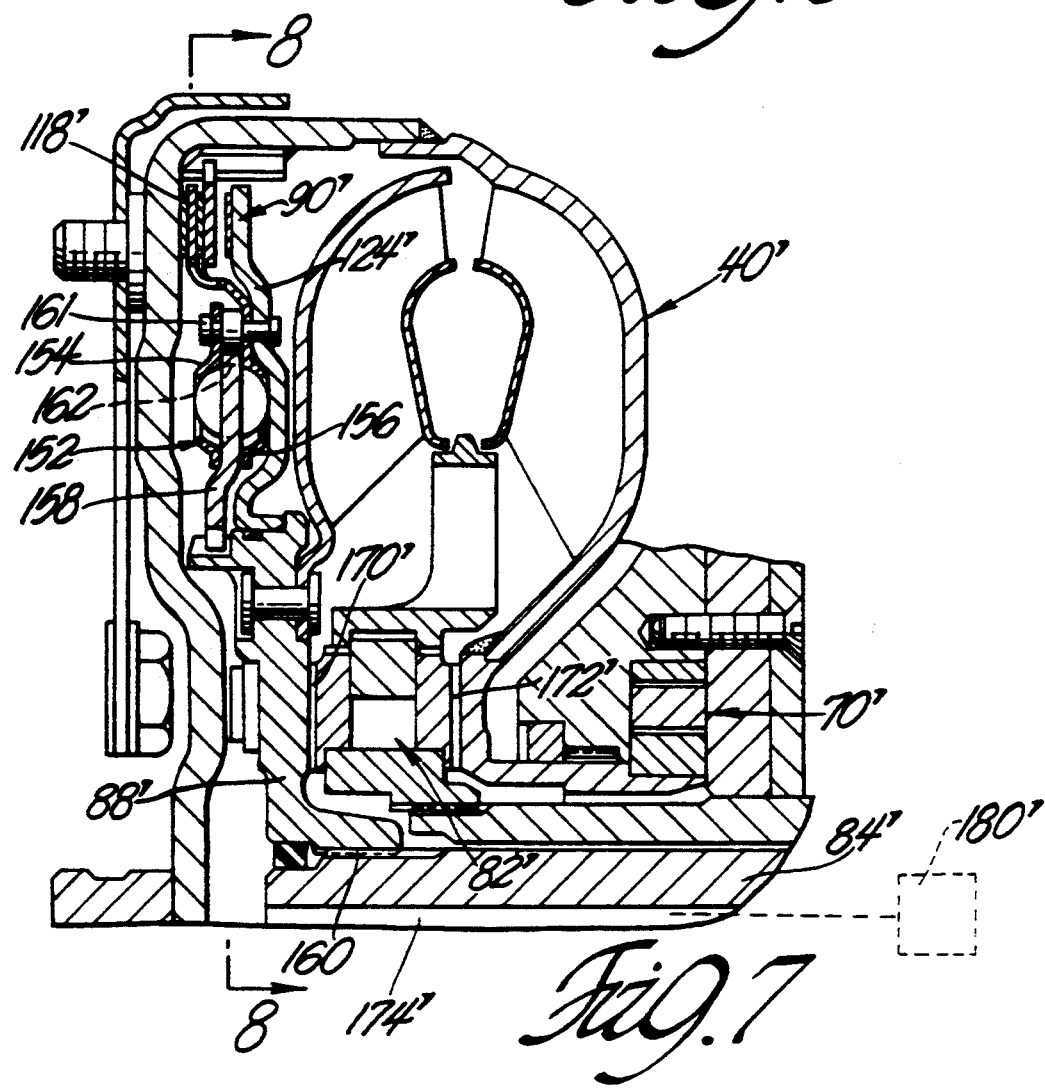
FIG. 7 is a sectional view of a torque converter including a second embodiment of the present invention.

FIGS. 1 through 3 disclose prior art torque converters that include torque lockout clutch mechanisms and torque dampers. FIGS. 4 and 7 discloses a torque converter that includes continuously operated bypass clutch devices in accordance with the present invention.

The prior art torque converter partially shown in FIG. 1 includes a lock-out mechanism 10 with a piston 12 connected to a spring damper mechanism 14. The piston 12 is disengaged when hydraulic pressure is selectively directed into a chamber 15 formed between the front cover 16 of the torque converter and the piston 12. When the chamber 15 is evacuated the piston 12 is biased to the left as viewed in FIG. 1 by the hydraulic pressure within the torque converter. Such piston movement causes a single surface friction 18 to engage the inner surface of the front cover 16 to lock the input and output of the torque converter. The spring damper mechanism 14 will neutralize engine vibrations. One problem with such an arrangement is that the spring damper mechanism 14 is connected between the piston 12 and a splined attachment ring 17 on the outer shell 19 of the turbine runner. Such arrangements are difficult to assemble.

The FIG. 2 torque converter includes a lockout mechanism 20 provided with a piston 22 connected to the output shaft at a hub 24 through a spring damper mechanism 25. During actuation, engine vibrations are attenuated by the spring damper mechanism that defines a single torque path from the front cover through spring damper mechanism 25 that is connected by attachment members 26 to hub 24, one of which is illustrated in FIG. 2.

The torque converter in FIG. 3 is like that in FIG. 2 but it includes a multiple friction plate lock-out clutch 30 that is selected to have a friction surface area that will have greater torque capacity during lock-out. The torque transfer path in the FIG. 3 system is through a single friction plate 32 that forms an outer ring of a spring damper assembly 34 thence through spring components 35 seated within arcuate openings 36 in the friction plate 32 and in openings 37 within an inner plate 38 of the spring damper assembly 34. The inner plate 38 is connected at a spline connection to the hub 39 that connects the turbine runner to the output shaft. The multiple friction plate clutch 30 is not operative to provide a heat resistant slip connection between a torque converter cover and an output shaft but rather is selected to provide a friction surface area that will assure lock-up of the input directly to the output shaft. The arrangement thus requires a damper assembly to attenuate disturbances imposed on the torque converter by the engine output.

In FIG. 4, a torque converter 40 is illustrated that, in accordance with the present invention, eliminates the damper assembly for neutralizing engine vibrations as discussed with respect to FIGS. 1-3. In the present invention the torque convertor 40 has a reduced front to rear envelope defined by a front cover 42 shaped as an elongated dish with an outer peripheral flange 44 joined to a casing 46 for a pump impeller 48. The pump casing 46 likewise is formed as a reduced width dish to contribute to the reduction of the dimensions in the front to rear envelope of the torque convertor.

The pump impeller 48 comprises the casing 46 and a plurality of pump impeller vanes 50 connected to the interior of the casing 46. The pump impeller vanes 50 are located on one side of a torque converter stator member 52 having a plurality of vanes 54. A torque convertor turbine runner member 56 with a plurality of vanes 58 is located within the front cover 42 on the opposite side of the stator member 52. A crankshaft 60 is connected to a ring gear 62. The ring gear 62 is connected by bolts 64 to the front cover 42. The pump impeller 48 is connected to a hollow sleeve 66 having an inboard end 68 that is connected to a hydraulic fluid pump assembly 70. Specifically, the outboard end 68 is splined at 72 and the splines 72 are connected to splines 74 on a rotor 76 of the hydraulic fluid pump assembly 70. A stationary stator support sleeve 78 is telescoped inwardly of sleeve 66. Sleeve 78 is connected by a spline connection 80 to an overrunning brake 82 that serves to brake movement of the torque converter stator member 52. A hollow output shaft 84 is directed through the support sleeve 78. The hollow output shaft 84 is connected by a spline connection 86 to a hub 88 that is, in turn, connected by rivets 89 to the shell of the turbine runner 56.

As is well known in the art, the torque converter 10 is operative to transmit rotational power between the crankshaft 60 and the output shaft 84 at a high speed during which time the pump impeller 48, the turbine runner 56 and the stator member 52 rotate as a unit along with a mass of hydraulic fluid contained within the torque converter 40. In such units, there can be a small slippage that will adversely affect the efficiency of the unit by wasted energy due to the slippage.

In contrast, the torque converter of FIG. 4, by including the present invention, eliminates a spring damper assembly, so as to reduce the cost and complexity of the torque converter while maintaining a slip range between the input and output shaft thereof that is close to that of torque converters with lockout clutch arrangements.

In the present invention, the damper assembly and lockout clutch are replaced by a continuous slip bypass clutch assembly 90 that is operative to produce a slip in the range of 10–70 RPM slip between the crankshaft 60 and the output shaft 84 depending upon the vehicle speed, throttle position and the torsional activity map of the input power source. The continuous slip bypass clutch 90 accordingly reduces the inherent 200–400 RPM slip typically present in torque converters that do not include a lockout capability. In accordance with the present invention, the continuous slip clutch assembly 90 is configured to approach the efficiency of a fully locked powertrain such as found in manual gear set transmission systems while eliminating the need for a damper assembly of the type shown in FIGS. 1–3 versions of prior art torque converters.

In accordance with the present invention the continuous slip clutch assembly 90 also attenuates or neutralizes the vibrational disturbances generated by an internal combustion engine having its crankshaft connected to the torque converter. Such disturbances affect powertrain durability and also produce disturbing resonate vibration modes within the powertrain and/or in the body structure of a vehicle in which the powertrain is mounted. In the present invention such vibrations are damped by the continuous slip clutch 90 without the need for including a separate spring damper assembly as heretofore used in prior art lockout assemblies as shown in FIGS. 1-3. The continuous slip clutch 90 of the present invention provides sufficient compliance to absorb or dampen the torsional disturbances inputed from the engine of the powertrain. Furthermore, the present invention is easier to assemble than prior art torque convertors with lock-out clutches. Also, the present arrangement simplifies the torque flow path by eliminating splines formed on the outside diameter of the actuating piston as shown at in the FIG. 2 version of the prior art or by eliminating the need for a separate spline ring attached to the turbine assembly as shown in the FIG. 1 version.

As shown in FIGS. 1-3 torque converters required full lock-out clutches. In such prior art configurations the friction liner or liners fully engage in the lockup phase of operation. If such a friction liners were to be use in a limited slip clutch assembly having slip in the range of 10-70 RPM slip there would be an excessive heat buildup with consequent degrading of the hydraulic fluid.

In accordance with the present invention, the limited slip clutch assembly is configured to control the thermal energy input to the friction surface thereof to avoid extremely high temperatures within the limited slip clutch assembly 80 that might lead to component distortion and/or thermal degradation of the friction material in the liner. Specifically, instead of employing a single surface liner of the type found in the prior art lock-out mechanisms of FIGS. 1 and 2, the limited slip clutch assembly 80 includes multiple friction surfaces 92, 94, 96.

The front cover 42 includes an integral spline ring 98 with internal spline teeth 99. A first ring shaped friction plate 100 has external spline teeth 102 thereon that are engaged within the spline teeth 99. The ring shaped friction plate 100 carries a friction liner 104 that defines the friction surface 92.

Figure 6:
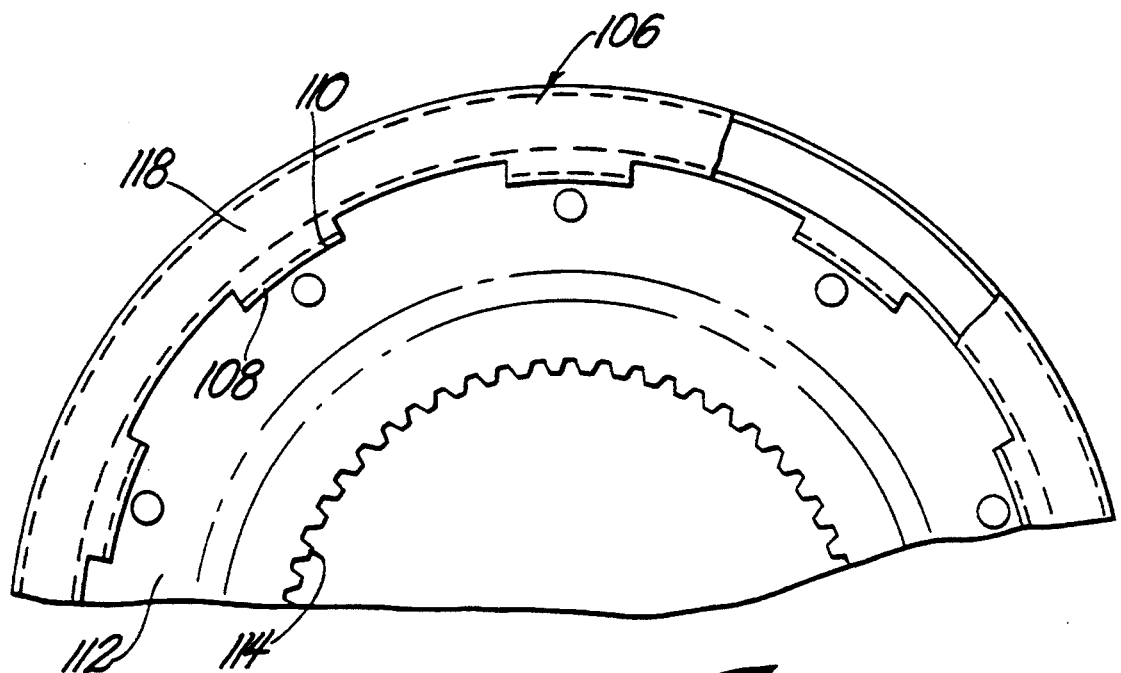
FIG. 6 is a fragmentary elevational view taken along the line 6—6 of FIG. 4 looking in the direction of the arrows.

As shown in FIG. 6, the limited slip clutch assembly 90 further includes a second ring shaped friction plate 106. It includes a splined I.D. 108 that is connected to splines 110 on a plate 112 having a splined I.D. 114 that is connected to splines 116 on the hub 88. The second ring shaped friction plate 106 carries a friction liner 118 that defines the friction surface 94.

The third friction surface 96 is defined by an annular friction liner 120 that is connected on the outboard surface 122 of a piston 124. The piston 124 includes an axially directed radially inwardly located flange 126 thereon that is slidably mounted on an outer annular surface 128 on the O.D. of the hub 88. An annular seal 130 in the surface 128 sealingly engages the inside surface 132 of the flange 126.

The piston 124 has a forwardly bent segment 134 thereon that engages a rearwardly bent segment 136 of the ring shaped plate 112. The segments 134 and 136 are connected by a plurality of circumferentially spaced rivets 138 or other suitable connectors. The interconnected piston 124 and plate 112 will move axially toward and away from the front cover 42 in response to variations in pressure within a chamber 140 defined by the cover 42, plates 106, 112 and the piston 124. In operation, depending upon the vehicle speed, throttle position and the torsional activity map of the torque converter, when the chamber 140 is evacuated, the piston 124 will be forced to the left as viewed in FIG. 4 so that the friction surface 96 will engage the ring shaped friction plate 100. It in turn is shifted axially to the left within the spline teeth 99 of the integral spline ring 98 on the front cover 42. The ring shaped friction plate 100 and friction liner 104 are thereby shifted to the left as viewed in FIG. 4 until the friction surface 94 engages the second ring shaped friction plate 106. When this occurs the second ring shaped friction plate 106 is shifted to the left as viewed in FIG. 4 until the friction surface 92 engages the front cover 12.

By virtue of the aforedescribed operation, three friction surfaces are engaged in a continuous slip mode at an operating pressure dependent upon the operation of the torque converter 40. The three friction surfaces 92, 94, 96 have a combined surface area that will provide a heat resistant slip connection between the front cover 42 and the output shaft 84. As a consequence, there is a reduced thermal distortion of the component parts of the limited slip clutch and there is reduced tendency to adversely thermally degrade the friction modifiers within the ATF or degrade the material comprising the friction liners. The continuous slip action also serves to attenuate or neutralize the engine output disturbances.

Another feature of the present invention is that the torque path from the front cover 42 to the hub 88 is divided with part of the torque actively passing from the integral spline ring 98 to the piston 124 and part of the torque actively passing from the integral spline ring 98 through the friction plate 106. The torque paths join at the connecters 138. As a consequence, lighter weight components can be employed in the clutch assembly.

Figure 9:
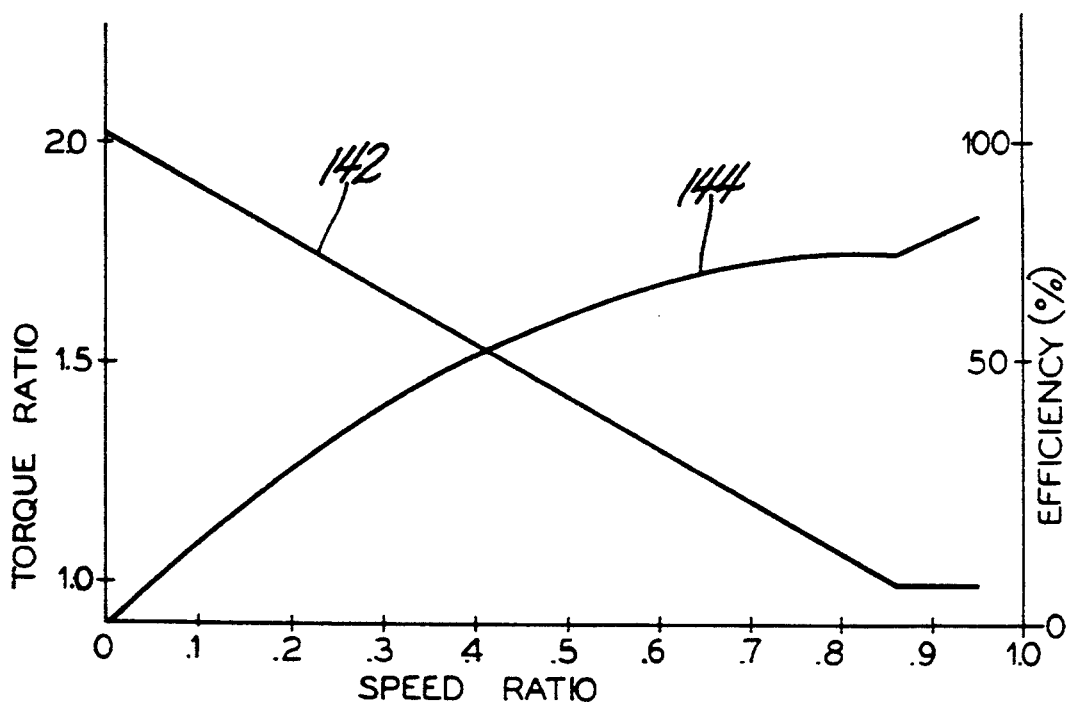
FIG. 9 is a chart showing performance characteristics of a torque converter including the present invention.

As seen in the FIG. 9 graph, the continuous bypass slip clutch 90 is operative after vehicle launch during which time the torque converter is utilized only for vehicle start-up. Once the torque converter torque ratio falls below 1.1:1 and/or an equivalent speed ratio, the pressure in the chamber 140 will cause the friction surfaces 92, 94 and 96 to engage and cause the clutch 90 to reduce the inherent slip exhibited by a conventional open torque converter. Thus, curve 142 in FIG. 9 shows the clutch becoming active when the torque ratio curve intersects the horizontal line representing a ratio of 1.1:1. In the illustrated arrangement the equivalent speed ratio is in excess of 0.75. The efficiency curve 144 in FIG. 9 becomes positive upon the clutch becoming active, e.g., at speed ratios of between 0.85 and 0.95 the efficiency increases from 85% to 95%.

Figure 5:
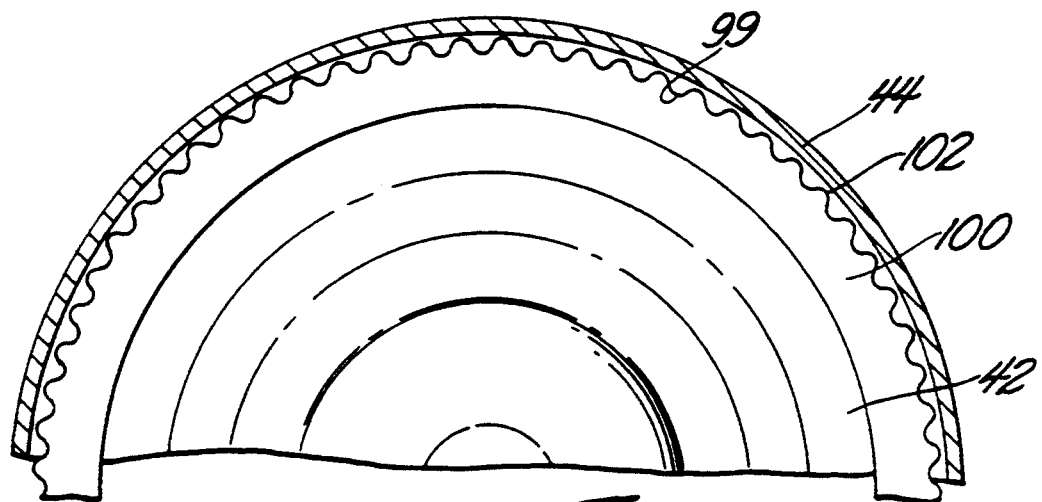
FIG. 5 is a fragmentary elevational view taken along the line 5—5 of FIG. 4 looking in the direction of the arrows.
Figure 8:
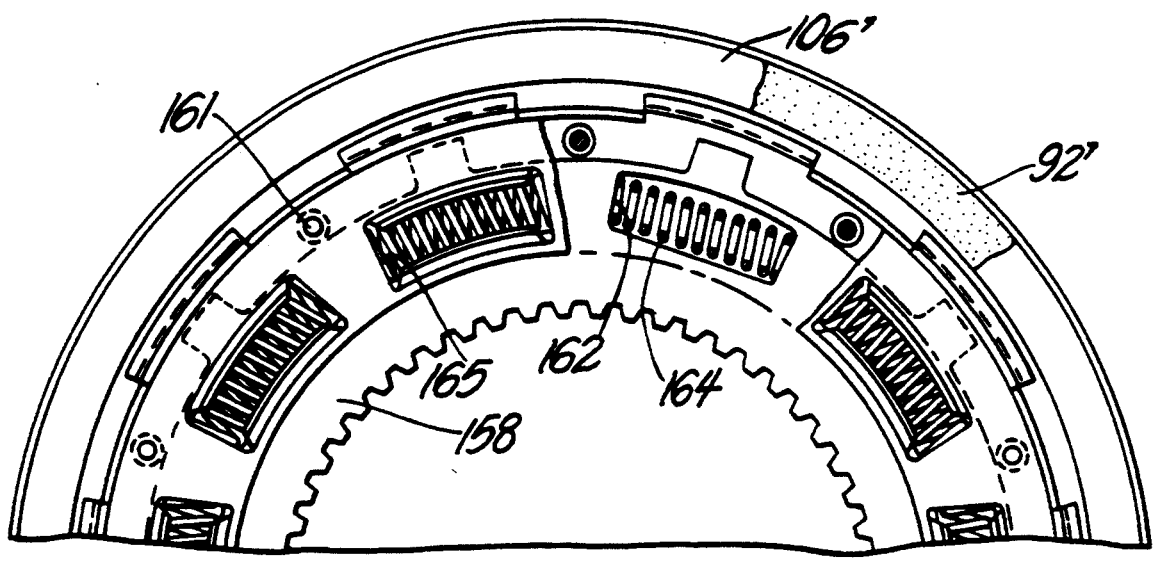
FIG. 8 is a fragmentary elevational view taken along the line 8—8 of FIG. 7 looking in the direction of the arrows.

Another feature of the present invention is that the improved slip clutch 80 is readily operable with a torsional coupling unit if additional torsional damping is required. Thus, as shown in FIGS. 7 and 8, a slip clutch 150 is provide corresponding to that described in the embodiment of the invention illustrated in FIGS. 4-6. The component parts of the slip clutch 150 that correspond to slip clutch 90 in the embodiment of FIGS. 4-6 are marked with the same reference numerals primed. The component parts of the clutch 150 that are so marked have the same configuration and same function as those described in the embodiment of FIGS. 4-6.

In the FIGS. 7 and 8 embodiment, parts corresponding to those of FIG. 4 carry like reference numerals primed. Torsional damping characteristics produced when the slip clutch 90' is active are further damped by a torsional damper 150 including three plates 154, 156 and 158. Plates 154, 156 form outer rings and the plate 158 is sandwiched therebetween. The inner plate 158 is fixed against rotation to the hub 88' at a splined connection 160. The inner plate 158 has a plurality of circumferentially spaced slots 162 in which damper springs 164 are located. The outer plates 154, 156 have like slots 165 that capture the springs 164. The outer plates 154, 156 have like slots 165 that capture the springs 164. The outer plates 154, 156 are connected to the piston 124' by rivets 161. The outer plate 156 is also connected to the friction liner 118' on the second friction ring 106' such that the front cover 42' will transfer engine disturbances through the Slip clutch 90' to the torsional damper 150 so as to compress the springs 164 in a manner to neutralize the engine vibrations. The addition of a torsional damper 150 in conjunction with the slip clutch 90' provides flexibility of design without modification of existing slip clutch components while retaining a direct torque flow path from the front cover 42' to the slip clutch 90' and to the associated torque damper 150 via the engaged liners to the outer plates 154, 156 of the torsional damper 152 thence to the drive hub 88'.

The slip clutch 90, 90' of the present invention is readily adaptable to use with either known two pass or three pass hydraulic supply circuits as will be apparent to those skilled in the art.

Although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

What is claimed is:

1. In a torque converter having a front cover and an interconnected pump casing having a pump impeller connected thereto and a turbine runner with an outer casing drivingly connected to an output hub and a clutch actuating piston rotatably mounted on said hub, the improvement comprising:

a continuously operative slip clutch assembly for coupling said front cover to said output hub for reducing the slip therebetween;

said slip clutch assembly including a splined ring on an inside diameter of the front cover and a first friction plate connected to said splined ring against rotation relative thereto; and a second friction plate and an inner plate radially aligned with said second friction plate for connecting said second friction plate to said hub for rotation therewith;

said piston operatively connected to said inner plate and responsive to operation of said torque converter to apply a pressure on said first and second friction plates whereby said front cover is connected to said hub through said second friction plate through a continuous slipping connection for increasing the efficiency of said torque converter and for partially damping engine disturbances inputed to said front cover;

said first friction plate having a friction liner on only one side thereof wherein this liner is adapted to be engaged with said second friction plate; said second friction plate having a friction liner on only one side thereof wherein this liner is adapted to be engaged with said front cover; said piston having a friction liner thereon adapted to be engaged with said first friction plate.

* * * * *